US012190757B1

(12) United States Patent
Shlaferman

(10) Patent No.: US 12,190,757 B1
(45) Date of Patent: Jan. 7, 2025

(54) LABEL

(71) Applicant: Soho Brands Inc., Brooklyn, NY (US)

(72) Inventor: Alexander Shlaferman, Brooklyn, NY (US)

(73) Assignee: Soho Brands Inc., Brooklyn, NY (US)

( * ) Notice: Subject to any disclaimer, the term of this patent is extended or adjusted under 35 U.S.C. 154(b) by 0 days.

(21) Appl. No.: 18/636,328

(22) Filed: Apr. 16, 2024

(51) Int. Cl.
*G09F 3/02* (2006.01)

(52) U.S. Cl.
CPC ........ *G09F 3/02* (2013.01); *G09F 2003/0202* (2013.01); *G09F 2003/022* (2013.01); *G09F 2003/023* (2013.01); *G09F 2003/0272* (2013.01)

(58) Field of Classification Search
CPC ............... G09F 3/02; G09F 2003/0202; G09F 2003/022; G09F 2003/023; G09F 2003/0272
See application file for complete search history.

(56) References Cited

U.S. PATENT DOCUMENTS

D161,825 S 2/1951 Deskey
D212,211 S 9/1968 Bass
3,775,882 A * 12/1973 Wheeler .................. G09F 3/04 40/645
D275,455 S 9/1984 Glaser
5,135,125 A * 8/1992 Andel ................ A61M 5/1417 40/310
5,490,658 A * 2/1996 Coward ............... B65D 23/005 248/205.3
5,647,624 A * 7/1997 Beshara, Jr. .............. A45F 5/10 D9/434
5,782,495 A * 7/1998 Grosskopf ........... B65D 23/005 283/81
5,951,076 A * 9/1999 Marco .................. B65D 23/104 215/396
5,967,560 A * 10/1999 Seidl .................... B65D 23/005 283/81
6,035,568 A * 3/2000 Grosskopf ............ G09F 3/0288 40/630
6,116,653 A * 9/2000 Oberholzer ............ B24D 15/00 283/79
6,125,563 A 10/2000 Girerd
6,272,780 B1 * 8/2001 Satamian ............. B31D 1/0018 40/310
6,283,346 B1 * 9/2001 Thomas ............... B65D 23/003 215/396
6,357,941 B1 * 3/2002 Amano ..................... G09F 3/10 60/761
(Continued)

*Primary Examiner* — David R Dunn
*Assistant Examiner* — Christopher E Veraa
(74) *Attorney, Agent, or Firm* — Weitzman Law Offices, LLC

(57) ABSTRACT

A label for a container involving a sheet material having a printable side and a reverse side, one or more weakened areas defining a tortuous or serpentine strip of the sheet material, a high tack adhesive on at least a portion of the reverse side, and the one or more weakened areas defining the tortuous or serpentine strip are organized such that the tortuous or serpentine strip remains part of the label and a backing material is not needed to maintain the tortuous or serpentine strip in place between manufacture of the label and application of the label to the label's intended container. A method form making a label is also disclosed.

18 Claims, 10 Drawing Sheets

(56) References Cited

U.S. PATENT DOCUMENTS

| | | | | |
|---|---|---|---|---|
| 6,361,010 | B1 * | 3/2002 | Grosskopf | F16L 3/233<br>248/205.3 |
| 6,431,401 | B1 | 8/2002 | Giblin et al. | |
| 7,762,398 | B2 * | 7/2010 | Tokie | G09F 3/0289<br>248/339 |
| 7,935,407 | B2 * | 5/2011 | Chen | A47G 33/08<br>428/542.6 |
| 2009/0057353 | A1 * | 3/2009 | Thomas | A45F 5/02<br>224/148.1 |
| 2021/0375160 | A1 * | 12/2021 | Vigunas | G09F 3/0341 |

* cited by examiner

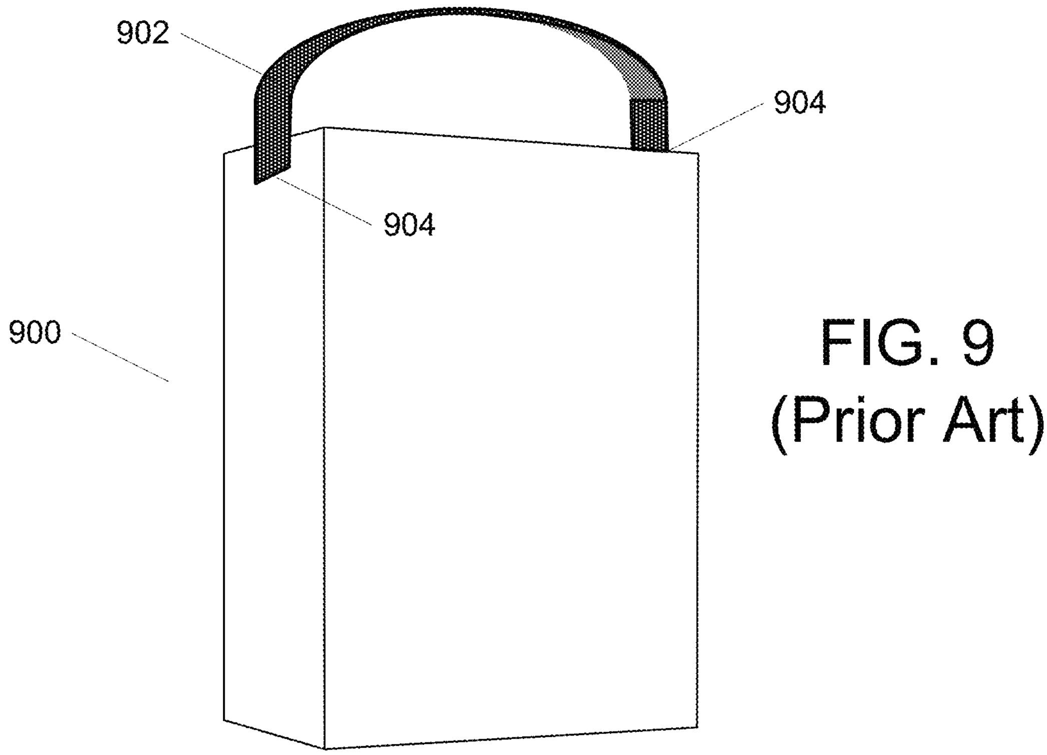
FIG. 9
(Prior Art)
FIG. 10
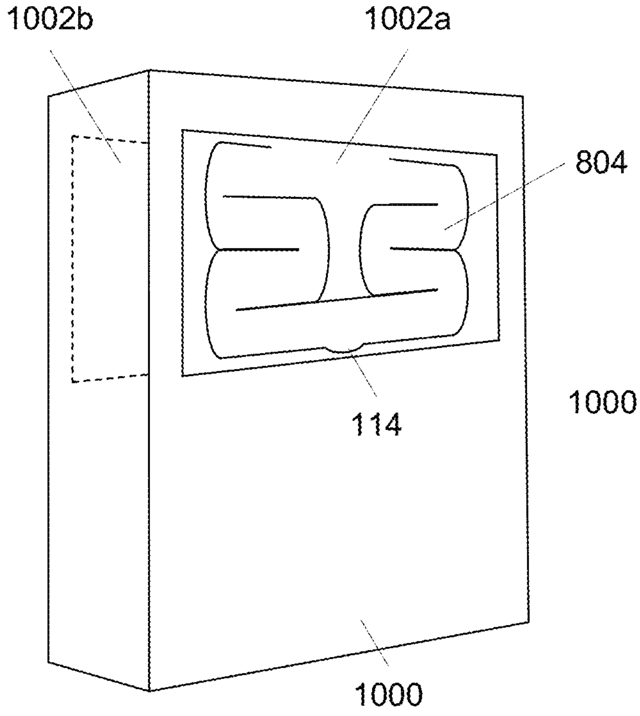
FIG. 11
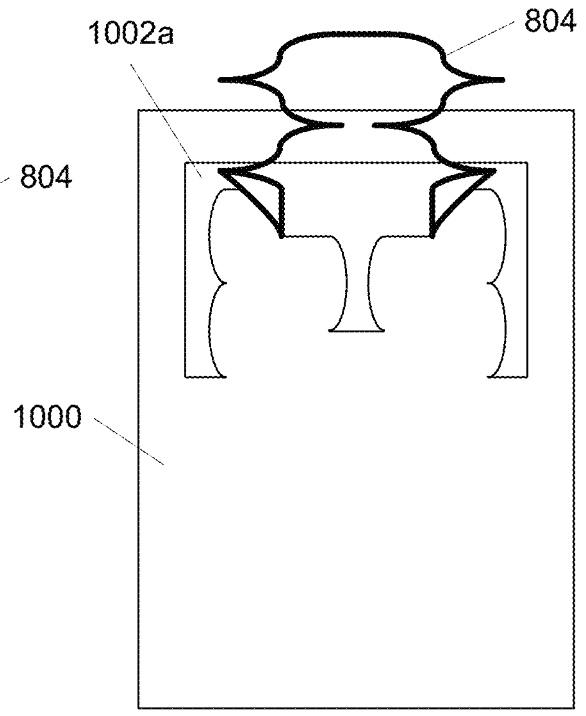

LABEL

FIELD OF THE INVENTION

This disclosure relates generally to labeling and, more particularly, to labels for containers.

BACKGROUND

Product labels are ubiquitous in the modern world, as they carry out the dual functions of increasing brand awareness and conveying important information about the labeled product to the purchaser or end user.

Presently, for products that bear separately applied labels, the product shape can dictate the shape of the label, in whole or part, even though the product and label are made separately and remote from each other. As a separate item, the ability to manufacture labels at low cost is a high priority.

Product containers themselves are often designed to perform one or more functions beyond merely the container function itself. For example, it is not uncommon for plastic containers for liquids, like milk, syrup, detergent, etc. to be molded such that they concurrently have a portion that can be easily grasped by a user, for example, a molded handle, as shown in U.S. Pat. No. 6,125,563, a narrowed, contoured area, as shown in U.S. Des. Pat. No. D161,825, or a narrowed neck area, as shown in U.S. Des. Pat. No. D212,211. Such molding can often require additional plastic and more complex molds, thereby increasing cost. Moreover, a feature of a package intended used to perform an additional function can affect the container shape such that bulk packaging of multiples of such containers will take up a much larger volume than the sum of the volumes within each would require.

As an alternative to an integrated handle, attempts have been made to incorporate an adjunct handle, for example, that is separately adhered to the container, as in U.S. Pat. No. 5,951,076 or that is manufactured concurrently with, but stands off from, a label on a bottle as in U.S. Pat. No. 6,125,563. Both of which approaches are unacceptable in some applications, because their placement is critical in that the handle can obscure part of the label and/or product.

For corrugated box-type packages, it is not uncommon for a portion to be cut out or displaceable so as to provide a type of handle. However, such approaches provide an opening through which foreign matter can enter and damage the contents.

SUMMARY

This disclosure describes solutions that provide significant advances in addressing the aforementioned problems.

One aspect of this disclosure involves a label for a container including a sheet material having a printable side and a reverse side opposite the printable side, one or more weakened areas defining a tortuous or serpentine strip of the sheet material, a high tack adhesive on at least a portion of the reverse side, and wherein the one or more weakened areas defining the tortuous or serpentine strip are organized such that the tortuous or serpentine strip remains part of the label and a backing material is not needed to maintain the tortuous or serpentine strip in place between manufacture of the label and application of the label to the label's intended container.

Another aspect of this disclosure involves a label for a container including a sheet material having a printable side and a reverse side opposite the printable side, one or more weakened areas defining a tortuous or serpentine strip of the sheet material, a high tack adhesive on at least a portion of the reverse side outside the weakened areas defining the tortuous or serpentine strip, and a low tack adhesive on at least a portion of the reverse side within the weakened areas defining the tortuous or serpentine strip.

A further aspect of this disclosure involves method of making a label. The method involves forming one or more weakened areas, defining a tortuous or serpentine strip, in a sheet material having a printable side and a reverse side opposite the printable side such that the tortuous or serpentine strip remains part of the label and a backing material is not needed to maintain the tortuous or serpentine strip in place between manufacture of the label and application of the label to the label's intended container, and applying a high tack adhesive to a reverse side of the sheet material in an area other than within the tortuous or serpentine strip defined by the one or more weakened areas.

BRIEF DESCRIPTION OF THE DRAWINGS

This disclosure is further described in the detailed description that follows, with reference to the drawings, wherein the same reference numbers appearing in the various drawings and description designate corresponding or like elements among the different views. and in which:

FIG. 9 illustrates, in simplified form, a representative example of a prior art container for example, a box of powdered detergent, a sack of flour or sugar, or a package for some other type of product;

FIG. 10 illustrates, in simplified form, a representative example of a similar container to that of FIG. 9 to which a label, constructed according to the teachings herein, is affixed;

FIG. 11 illustrates, in simplified form, the container of FIG. 10 after the tab has been pulled to deploy the tortuous or serpentine strip as a handle;

DETAILED DESCRIPTION

I have developed a label that is capable of performing a dual function, namely that of a printable label that can convert to form a convenient carrying handle or sling which a user can conveniently use to carry the product to which it is affixed. As such, the package to which it is affixed can have a compact shape and need not be designed to facilitate carrying or to accommodate a separately incorporated handle.

Notably, in simplified overview, the design is such that the label becomes a strap or handle as opposed to having an auxiliary portion whose sole function is to act as a handle. Rather, the design is such that the label itself converts into a strap or handle when needed. Thus, the label can readily be used with such varied containers as, for example, 250 ml (~8 oz) or larger plastic water bottles, 2 liter soda bottles, bags of sugar or flour, 4.5 liter or larger liquid detergent bottles, 2.5 kg or larger powered detergent boxes, etc. My design is even suitable for use as a shipping label that can be affixed to a shipping box from a distribution company such as Amazon.com, Inc., or delivery entities like the United States Postal Service, United Parcel Service, Inc. (UPS) or FedEx Corp. Advantageously, in this manner, if the delivered box is heavy and/or of awkward size and/or shape, a label as described herein can provide a handle or strap that makes it easier for the recipient to move or maneuver the delivered box, while eliminating the need for an opening or separate handle piece.

As an initial matter, as used herein, the term "container" is intended to mean and herein means: any bottle, jug, bag, box, carton or other packaging to which a label is affixed, whether for purposes of providing information about the product contained therein, advertising, or source and/or destination information.

Figure 1:
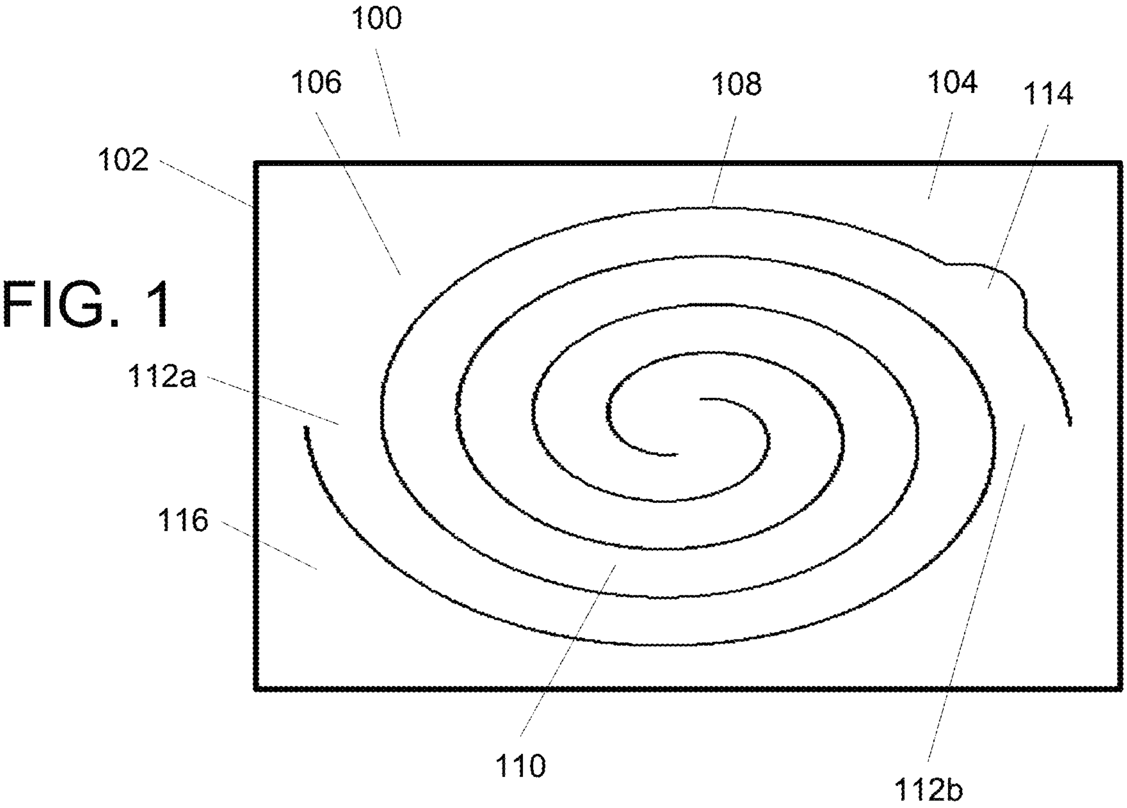
FIG. 1 illustrates, in simplified form, one example implementation of a label in accordance with the teachings herein.

FIG. 1 illustrates, in simplified form, one example implementation of a label 100 in accordance with the teachings herein.

The label 100 (as well as the other labels described herein) is made up of a single layer, printable, polymer sheet material having a non-directional grain and, optionally, depending upon the expected weight of the container to which it will be attached, the polymer may further include fiber reinforcements therein to add strength.

The label 100 has a peripheral boundary 102 which, although shown as rectangular, can be of any shape appropriate to the container to which it will be attached.

In FIG. 1, the face side 104 is shown and is the side which would carry whatever print is appropriate for the particular intended application. Optionally, for some implementations, the side opposite the face side can also carry printing on all or part of it, for example, if the label is to be affixed to a clear bottle.

The label 100 further includes a pattern 106 comprising one or more weakened areas, 108 for example, formed from perforations, slits, score marks, non-perforating etch lines, etc. which define the periphery of a continuous tortuous or serpentine strip 110 extending from one location **112*a* on the label 100 to another location 112*b* on the label 100. The weakened areas are structured such that the application of a nominal force (e.g., in excess of 0.45Newtons (~0.1 lbs)) to a part of the strip 110 will cause it to separate from the rest of the label 100 along the weakened areas 108** so as to form a handle or strap, depending upon its length.

Depending upon the particular implementation, the weakened areas described herein can be formed using a blade, laser or needle-like device to make a series of discontinuous openings through the label, they can be formed using a heated die or laser to melt or thin the label in specific areas, they can be formed by an etching-type process or any other known process that achieves a similar result, the important aspect being that the continuous tortuous or serpentine strip defined by the weakened areas remains attached to the label until at least a specified force is exerted upon it and without the need for a backing material (also sometimes referred to as a release liner) to maintain the tortuous or serpentine strip in place between the time of manufacture and application to a container. In view of the foregoing, depending upon the particular weakened areas, and how they are formed, they may only be visible on one side of the label (if they do not pass through the label) or on both sides, if they do.

Optionally, the a portion of the strip 110 can include a tab 114 which can be grabbed to facilitate separation of the strip 110 from the rest 116 of the label 100. Depending upon the particular implementation, the weakened area 108 defining the tab 114 will ideally be entirely cut through so as to facilitate its lifting out of the surface of the label 100 with ease.

As shown in FIG. 1, the weakened areas 108 create a tortuous or serpentine strip 110 that is of a spiral-like shape. However, as will be appreciated, and shown herein, other configurations of weakened areas 108 can be used to create any of a myriad of tortuous or serpentine strips 110.

Figure 2:
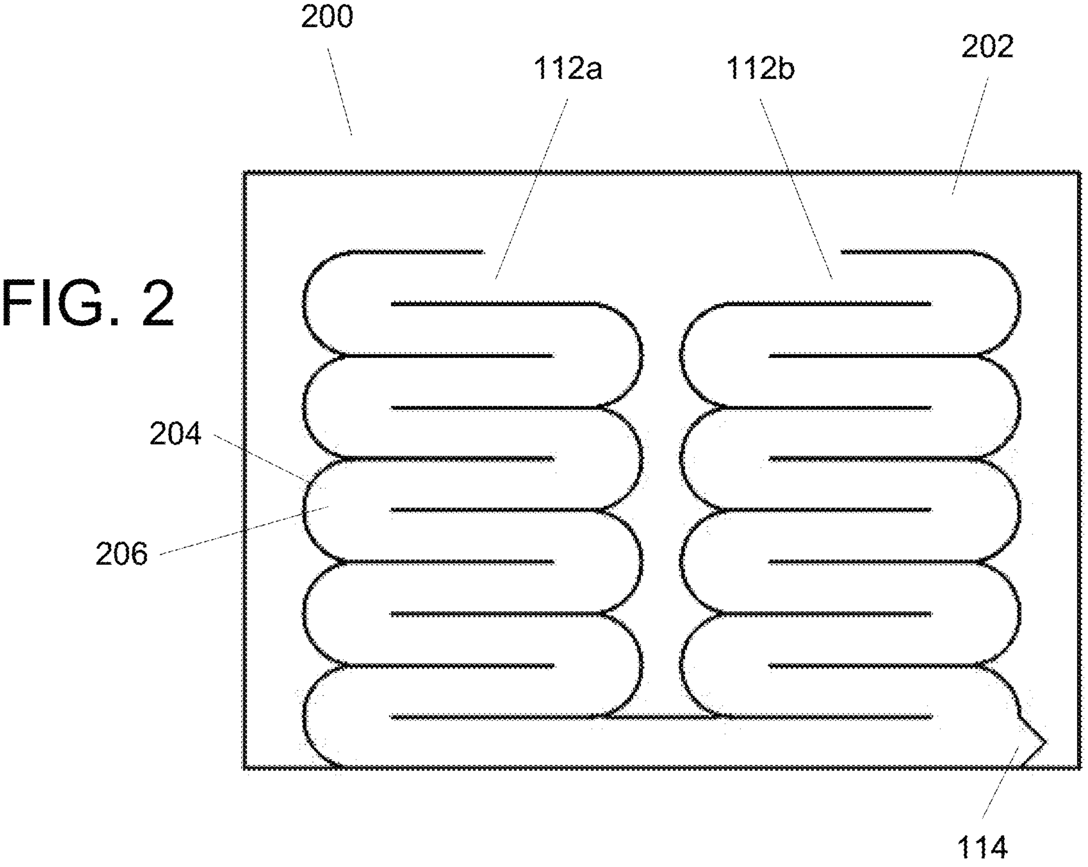
FIG. 2 illustrates, in simplified form, another example implementation of a label in accordance with the teachings herein.

FIG. 2 illustrates, in simplified form, another example implementation of a label 200 in accordance with the teachings herein.

More particularly, FIG. 2 shows the face side 202 (i.e., printable side) of the label 200. As with the label 100 of FIG. 1, the label 200 of FIG. 2 includes weakened areas 204, as described above, that define the periphery of an alternative tortuous or serpentine strip 206.

Advantageously, the weakened areas are structured so as to minimally interfere or be apparent (if at all) with the printing that will appear on a label as described herein once printed.

Figure 3:
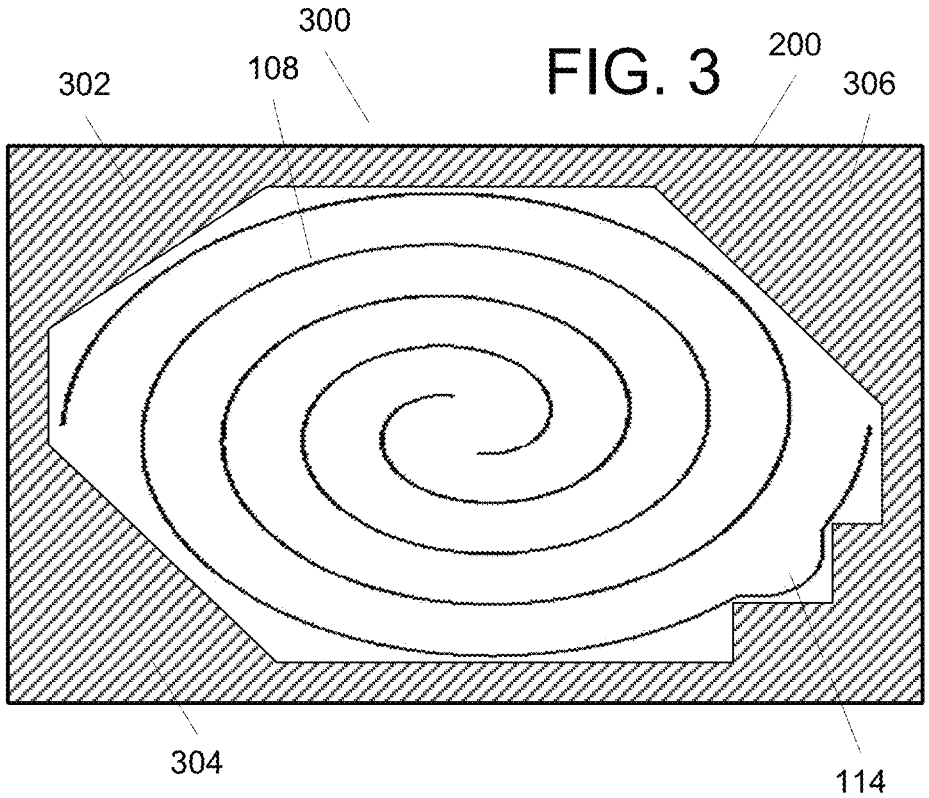
FIG. 3 illustrates, in simplified form, one example of a configuration for the reverse side of the label 100 of FIG. 1 in accordance with the teachings herein

FIG. 3 illustrates, in simplified form, one example of a configuration 300 for the reverse side 302 (flipped about the horizontal) of the label 100 in accordance with the teachings herein.

As shown in FIG. 3., with this example configuration, the reverse side 302 includes an area of high tack adhesive 304 (denoted by diagonal hatching) which is used to attach the label to its intended container. As shown in FIG. 3, the area 306 within which the weakened areas 108 reside lacks adhesive.

The high tack adhesive 304 is applied as a so as to leave certain specifically defined areas devoid of adhesive) on the reverse side 302, ideally using a process called pattern coating or pattern printing, although any method for applying adhesive will work.

With the ideal process, adhesive can be applied using any machinery capable of applying a pattern of adhesive as described herein, however, it is believed that pattern printing of the adhesive provides advantages over other approaches in terms of, for example, cost and speed. A representative supplier who can perform pattern coating or pattern printing (interchangeably referred to herein, for simplicity, as "pattern printing") of adhesives in the manner described herein is Rayven Inc., of 431 Griggs Street N., St. Paul, MN 55104.

Alternatively, although less desirable, the entire area of the reverse side 302 of the label can be coated with adhesive using any conventional approach, and then the area 306 within which the weakened areas 108 reside can be "de-tackified" in known manner.

Thus, it should be appreciated that the important aspect is merely having adhesive on the reverse side in certain areas, not the manner in which the adhesive is applied.

Figure 4:
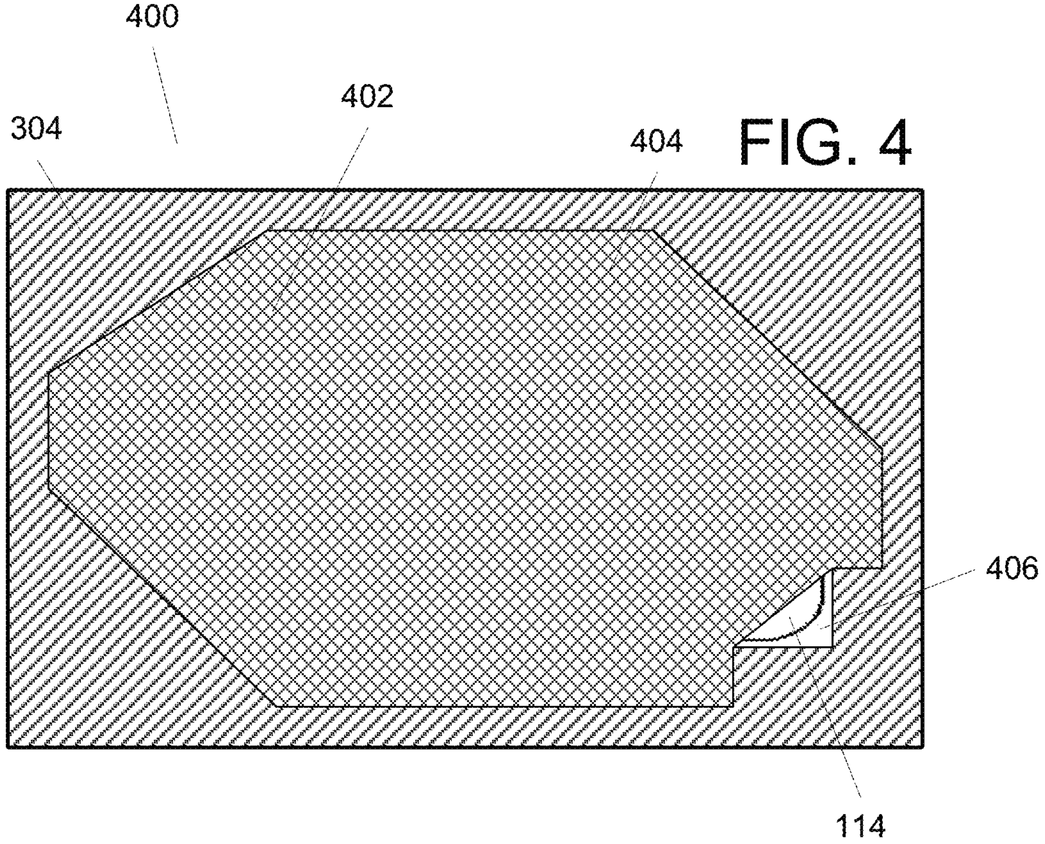
FIG. 4 illustrates, in simplified form, an alternative example of a configuration for the reverse side of the label of FIG. 1 in accordance with the teachings herein.

FIG. 4 illustrates, in simplified form, an alternative example of a configuration 400 for the reverse side 302 of the label 100 in accordance with the teachings herein.

As shown in FIG. 4, the label 100 includes a high tack adhesive 304 as in FIG. 3, but also includes another area 402 (denoted by cross hatching) containing a low tack adhesive 404. In addition, an area 406 containing the tab 114 is devoid of adhesive (an may be cut through as described above) so as to facilitate lifting of the tab 114.

As with the high tack adhesive 304, the low tack adhesive 404 will ideally be pattern printed as well.

Both high tack and low tack adhesives are well known in the art and can be dependent upon the material (e.g., type of plastic, cardboard or paper and any associated coating(s)) to which a label will be attached. Accordingly, the specific selection of any particular adhesive is a matter of design choice. Likewise, techniques for de-tackifying an adhesive are also well known and can depend upon the particular adhesive selected. As such, any de-tackifying technique used will be a matter of design choice as well related to the adhesive to be de-tackified.

Figure 5:
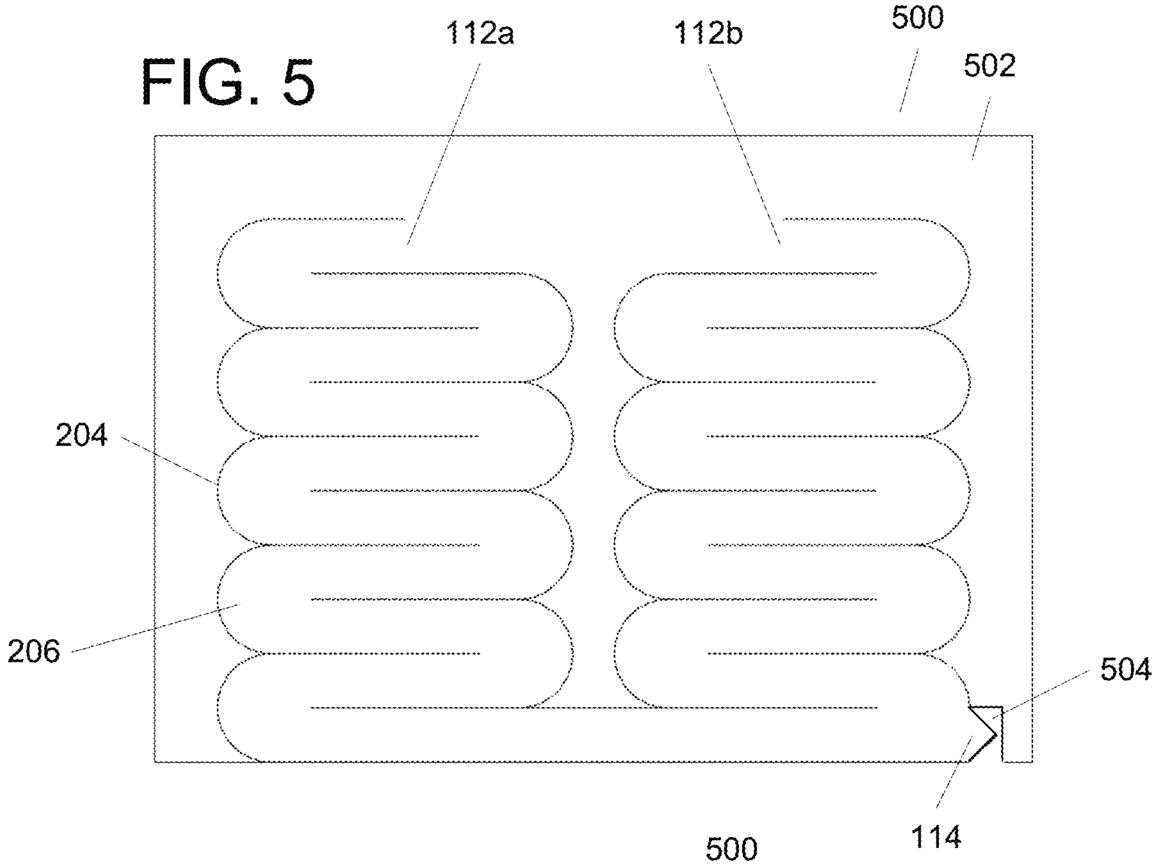
FIG. 5 illustrates, in simplified form, another example implementation of a label in accordance with the teachings herein.

FIG. 5 illustrates, in simplified form, another example implementation of a label 500 in accordance with the teachings herein.

More particularly, FIG. 5 shows the face side 502 (i.e., printable side) of the label 500 which, as shown, is virtually identical to the label 200 of FIG. 2, except that this example implementation label 500 includes a cutout 504 to provide for easier access to the tab 114.

Figure 6:
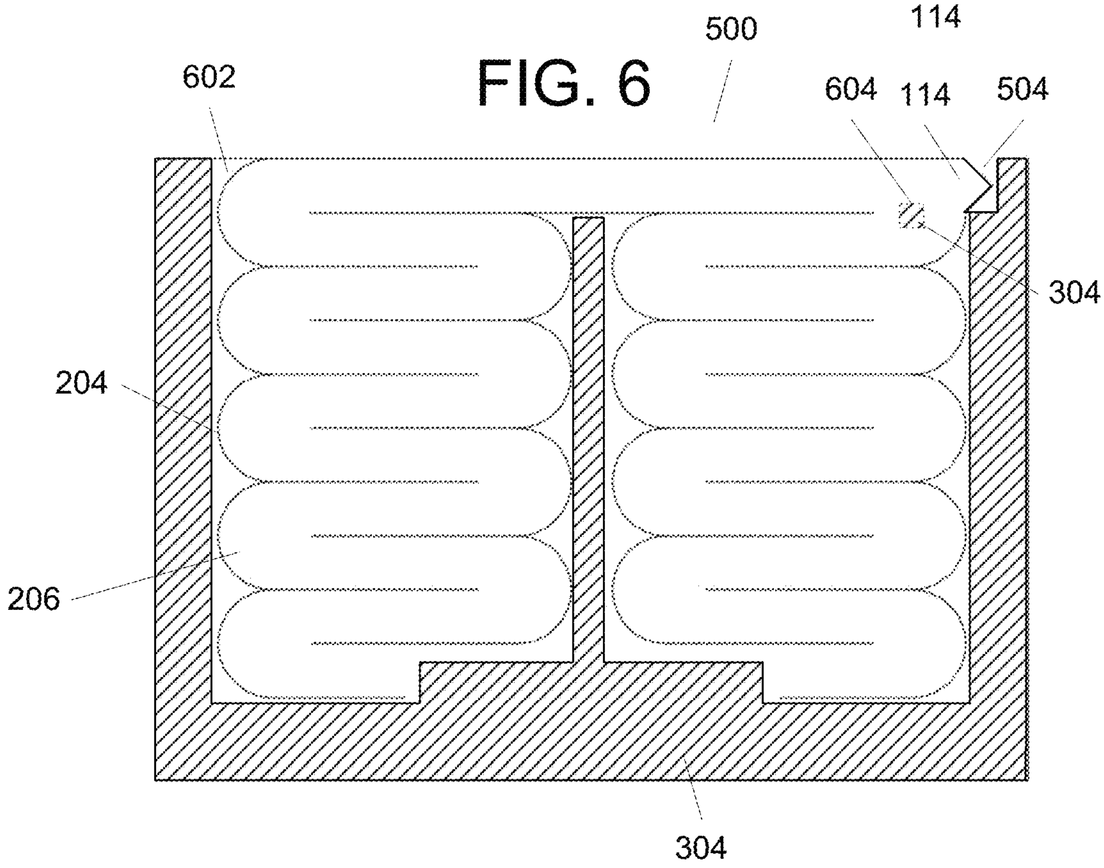
FIG. 6 illustrates, in simplified form, an example implementation of the reverse side of the label 500 of FIG. 5.

FIG. 6 illustrates, in simplified form, an example implementation of the reverse side 602 (flipped about the horizontal) of the label 500 of FIG. 5. As shown in FIG. 6, the reverse side includes a high tack adhesive 304 over a portion of its area and no adhesive in the area containing the defined tortuous or serpentine strip 206, other than an optional small area 604 of high tack adhesive 304 near the tab to guard against accidental deployment of the tortuous or serpentine strip 206.

Figure 7:
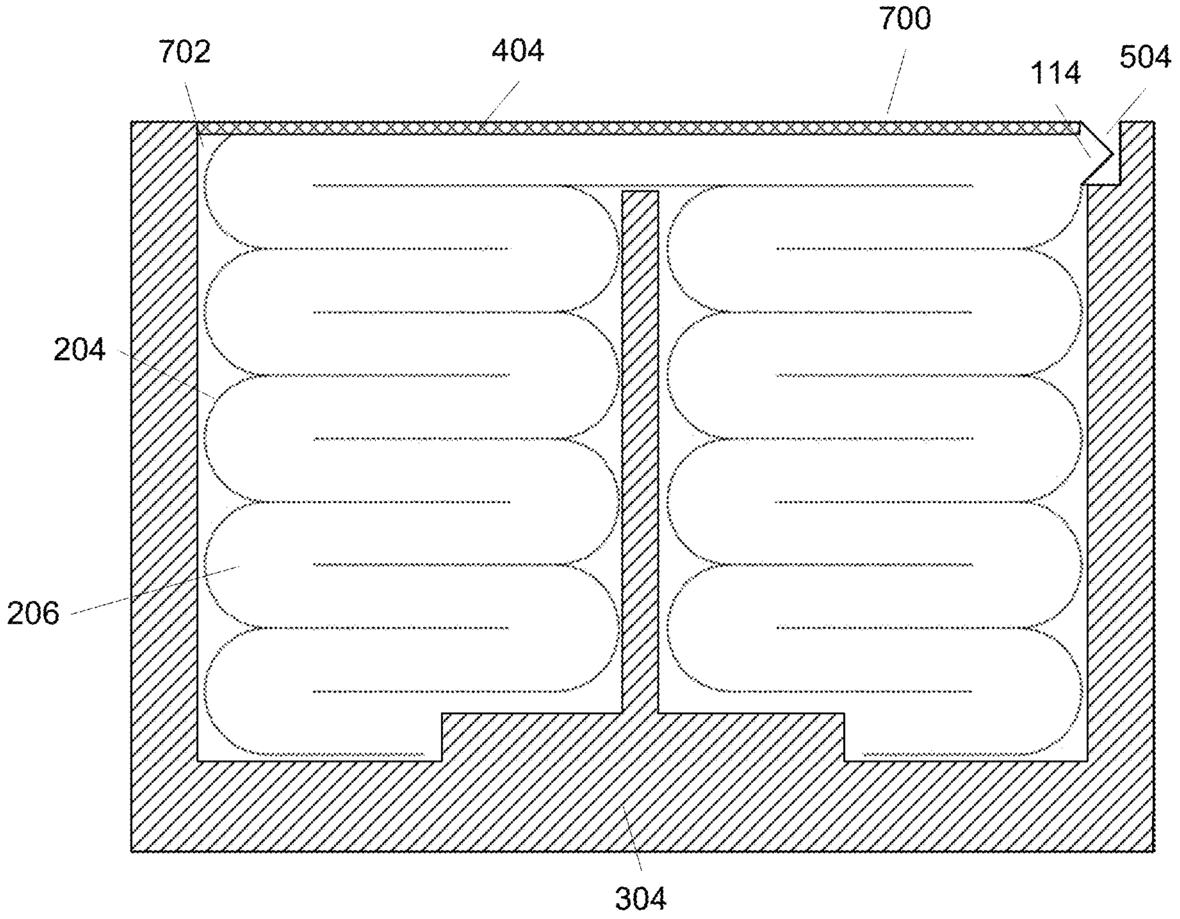
FIG. 7 illustrates, in simplified form, an alternative example implementation of the reverse side of the label of FIG. 5.

FIG. 7 illustrates, in simplified form, an alternative example implementation of the reverse side 602 of the label 500 of FIG. 5 which is identical to that of FIG. 6 except, with this configuration, the reverse side further includes a thin area of low tack adhesive 404 along the edge lacking adhesive in FIG. 6 in order to reduce the risk of inadvertent pulling on or detachment of the defined tortuous or serpentine strip 206.

Figure 8A:
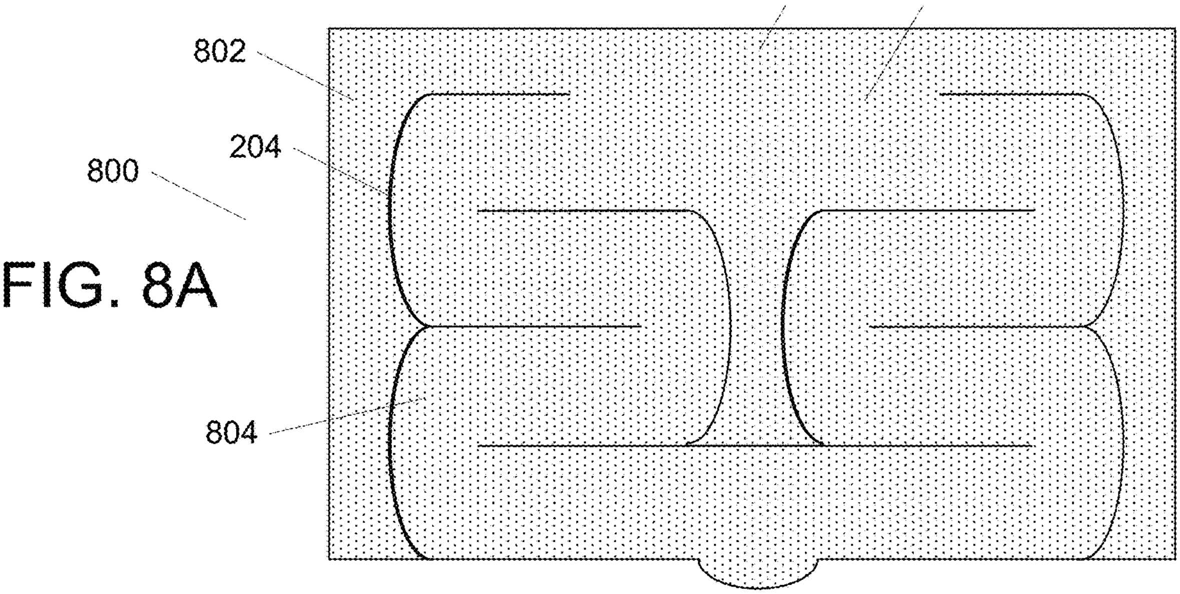
FIG. 8A illustrates, in simplified form, another example implementation of a label in accordance with the teachings herein.

FIG. 8A illustrates, in simplified form, another example implementation of a label 800 in accordance with the teachings herein.

More particularly, FIG. 8A illustrates, in simplified form, an example implementation of the reverse side 802 of an example implementation that is configured such that the tortuous or serpentine strip 804 defined by the weakened areas 204, when deployed, will be shorter and wider than those discussed previously. In addition, the material 806 of this example implementation label 800 includes fiber reinforcements 808 (represented by the internal dots) to allow the tortuous or serpentine strip 804 to act as a handle for heavier containers.

Figure 8B:
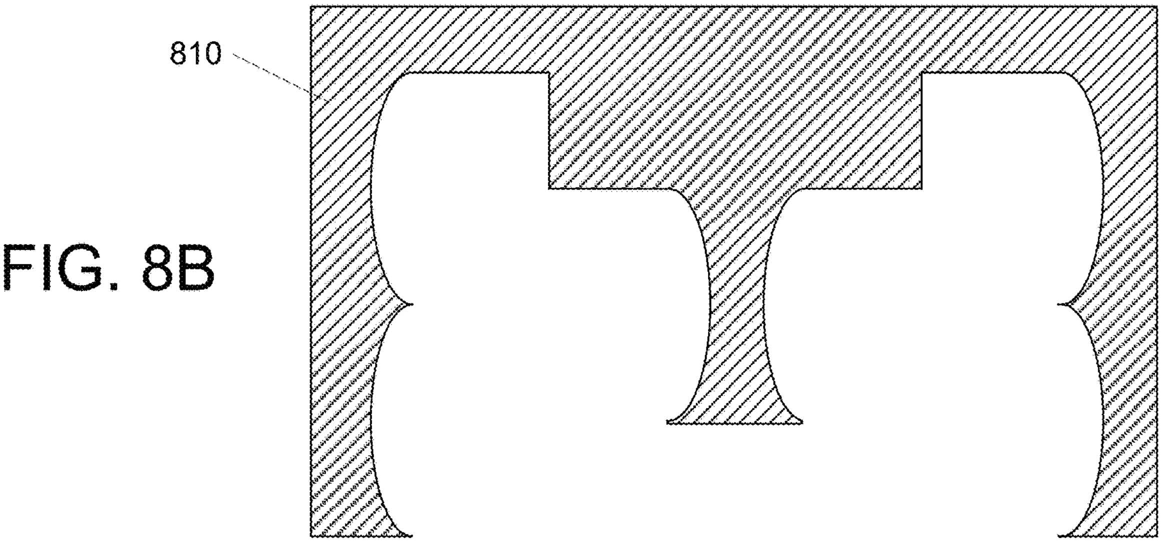
FIG. 8B illustrates, in simplified form, an example layout for pattern printing a high tack adhesive onto the label 800 of FIG. 8A.

FIG. 8B illustrates, in simplified form, an example layout 810 for pattern printing a high tack adhesive onto the label 800 of FIG. 8A if the defined tortuous or serpentine strip 206 is to be devoid of adhesive or optionally contain a low tack adhesive.

Figure 8C:
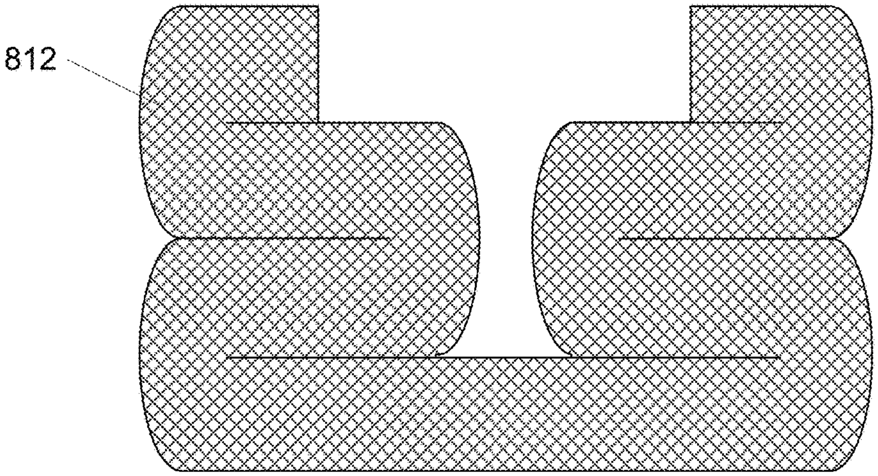
FIG. 8C illustrates, in simplified form, an example layout for pattern printing a low tack adhesive onto the label of FIG. 8A or for de-tackifying an adhesive within the specified area.

FIG. 8C illustrates, in simplified form, an example layout 812 for pattern printing a low tack adhesive onto the label 800 of FIG. 8A or for de-tackifying an adhesive within the specified area.

FIG. 9 illustrates, in simplified form, a representative example of a prior art container 900, for example, a box of powdered detergent, a sack of flour or sugar, or a package for some other type of product. As shown, the container 900 includes a conventional handle 902 that has its ends 904 inserted through a slot into, or affixed to the outside, of the container. This configuration takes up space and, can easily get caught on something during transport from, for example, a warehouse to a store or ultimate recipient.

FIG. 10 illustrates, in simplified form, a representative example of a similar container 1000 to which a label 1002*a*, constructed according to the teachings herein, is affixed. As can be seen, with a label 1002 as described herein, there is no exposed handle that can get caught on something during transport unless/until an end recipient deploys it. Still further, and unlike the handle of FIG. 9, the label of FIG. 10 can, for example, serve as the basic product label, a shipping label, or can contain other information about the contents of the container 1000 or its source.

As further can be seen in FIG. 10, a similar label 1002*b* (shown in ghost lines) can be applied to the opposite side and can contain different information, and the tortuous or serpentine strip 804, if the tortuous or serpentine strip 804 is/are deployed, as handles, by pulling on the associated tab 114, they provide even greater, and more balanced, carrying capacity.

FIG. 11 illustrates, in simplified form, the container 1000 of FIG. 10 after the tab 114 has been pulled to deploy the tortuous or serpentine strip 804 as a handle.

Figure 12:
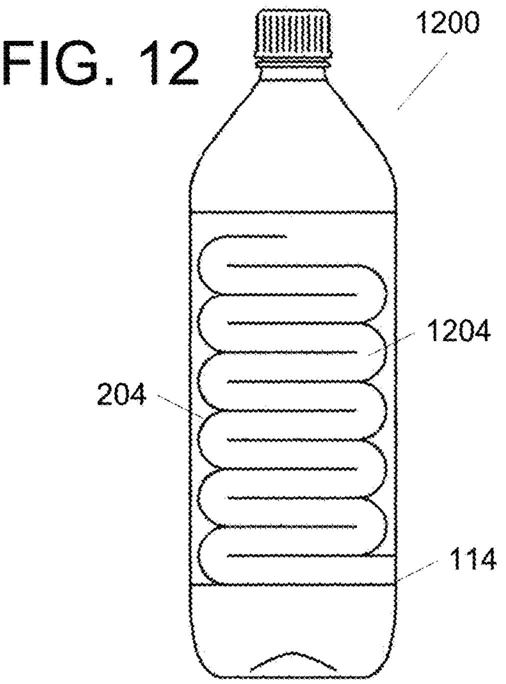
FIG. 12 illustrates, in simplified form, a representative example of a bottle for a liquid containing a label constructed in accordance with the teachings herein.

FIG. 12 illustrates, in simplified form, a representative example of a bottle 1200 for a liquid containing a label 1202 constructed in accordance with the teachings herein. As shown in FIG. 12, the bottle 1200 is a drink bottle for water, juice, soda, iced tea or other beverage and the tortuous or serpentine strip 1204 in this configuration is constructed such that, when deployed, the tortuous or serpentine strip 1204 will create a long strap. Notably, with this configuration, the material for this the label 1202 is such that it is sturdy enough to support the weight of the bottle 1200 and its contents, but a pulling force applied to the tortuous or serpentine strip 1204 in excess of a selected force will cause the tortuous or serpentine strip 1204 to rupture.

Figure 13:
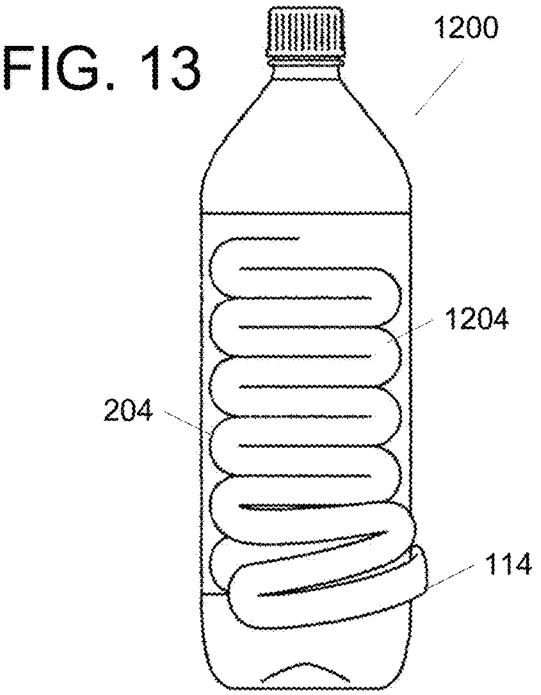
FIG. 13 illustrates, in simplified form, the bottle of FIG. 12 as the tortuous or serpentine strip of the label is beginning to be deployed.

FIG. 13 illustrates, in simplified form, the bottle 1200 as the tortuous or serpentine strip 1204 of the label 1202 is beginning to be deployed by pulling on a tab 114 which causes rupture along the weakened areas 204.

Figure 14:
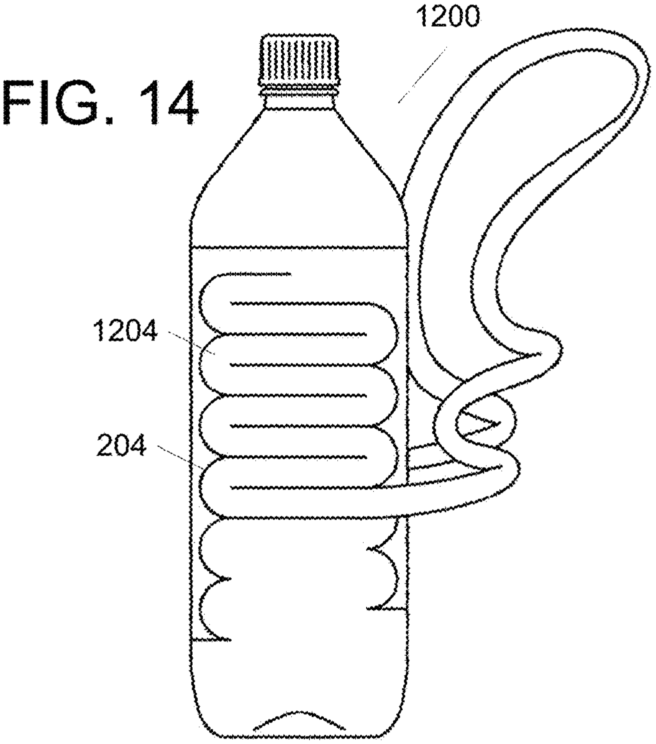
FIG. 14 illustrates, in simplified form, the bottle of FIG. 12 as more of the tortuous or serpentine strip of the label has been deployed.

FIG. 14 illustrates, in simplified form, the bottle 1200 as more of the tortuous or serpentine strip 1204 of the label 1202 has been deployed.

Figure 15:
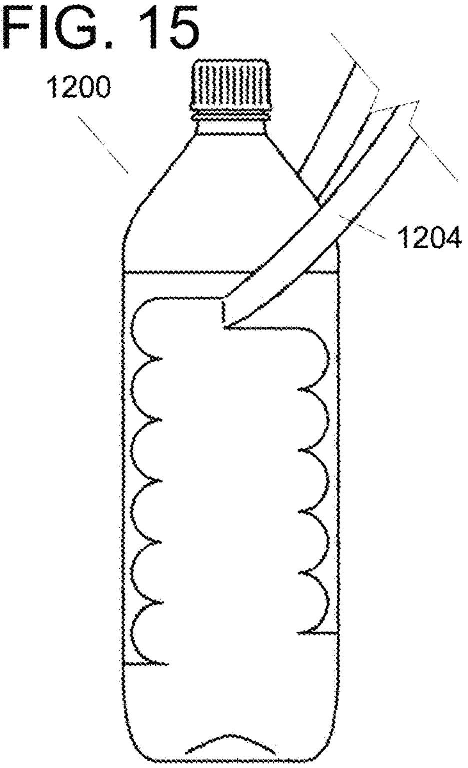
FIG. 15 illustrates, in simplified form, the bottle of FIG. 12 once the tortuous or serpentine strip of the label has been fully deployed to create a long strap.

FIG. 15 illustrates, in simplified form, the bottle 1200 once the tortuous or serpentine strip 1204 of the label 1202 (only a portion of which is shown) has been fully deployed to create a long strap.

Figure 16:
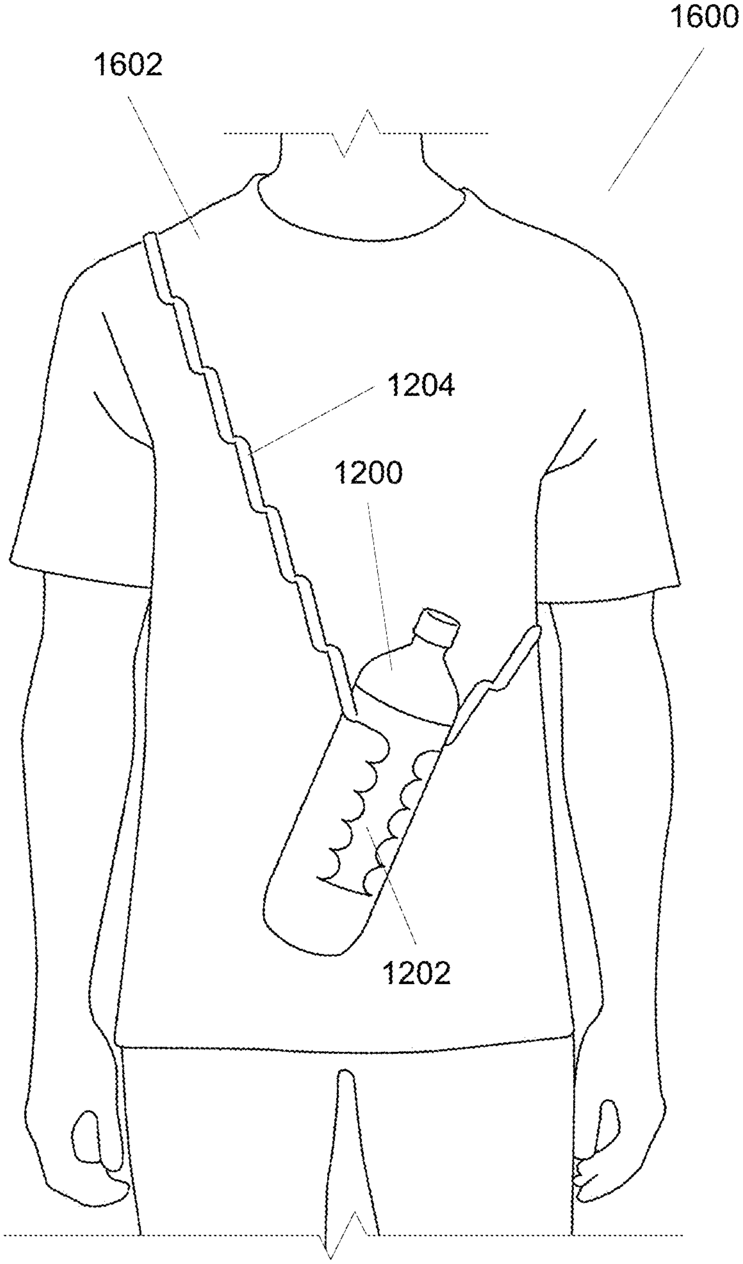
FIG. 16 illustrates, in simplified form, the bottle of FIG. 12 with the tortuous or serpentine strip of the label serving as a strap across the torso of a person.

FIG. 16 illustrates, in simplified form, the bottle 1200 with the tortuous or serpentine strip 1204 of the label 1202 serving as a strap across the torso 1602 of a person 1600 so that they can "hands free" carry the bottle 1200.

Figure 17:
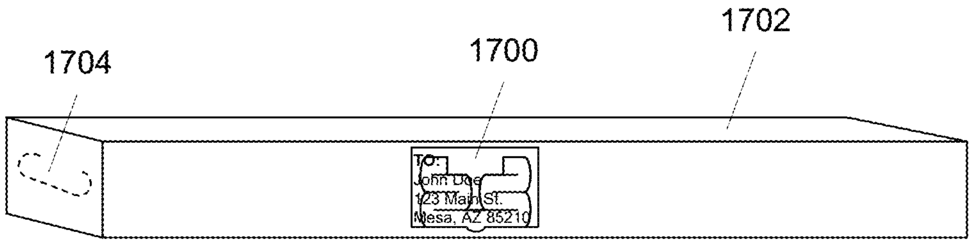
FIG. 17 illustrates, in simplified form, another application for a label constructed according to the teachings herein.

FIG. 17 illustrates, in simplified form, another application for a label constructed according to the teachings herein. As shown in FIG. 17, the label 1700 is a shipping label affixed to an elongate container 1702, which can be awkward to carry. The use of the label 1700 allows for a handle to be placed in a more convenient location on the container 1702 for deployment and use by the recipient in lieu of, or as an adjunct to, for example, a conventional cutout 1704 (often used on corrugated cardboard containers) which can be placed in an unhelpful position or, in some cases, can provide an avenue for foreign material to enter the container 1702 and damage the contents.

Figure 18:
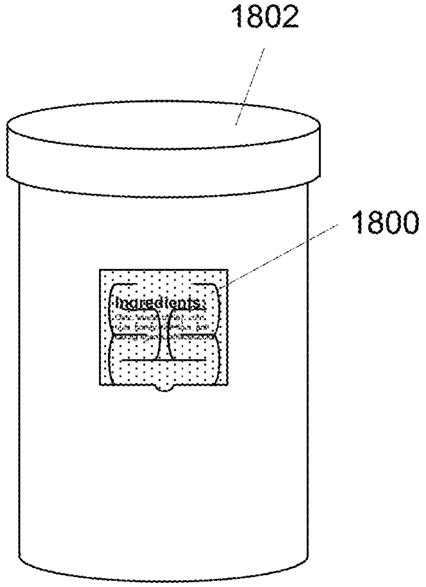
FIG. 18 illustrates, in simplified form, still another application for a label constructed according to the teachings herein.

FIG. 18 illustrates, in simplified form, still another application for a label constructed according to the teachings herein. As shown in FIG. 18, the label 1800 is on a large container 1802 of a type that may be found in a big box store (e.g., Costco®, Sam's Club®, BJ's® Wholesale Club) and contains printed matter relating to the contents of the container, for example, ingredients, a company logo, the name of the product or other information.

Figure 19:
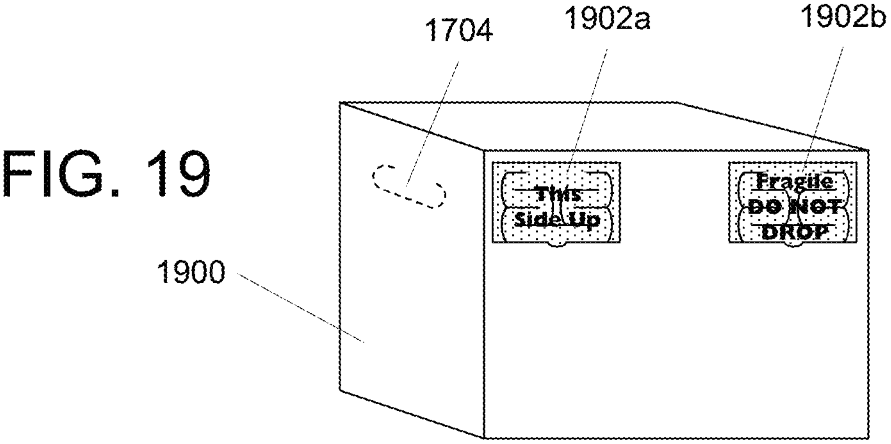
FIG. 19 illustrates, in simplified form, yet another application for a label constructed according to the teachings herein.
Figure 20A:
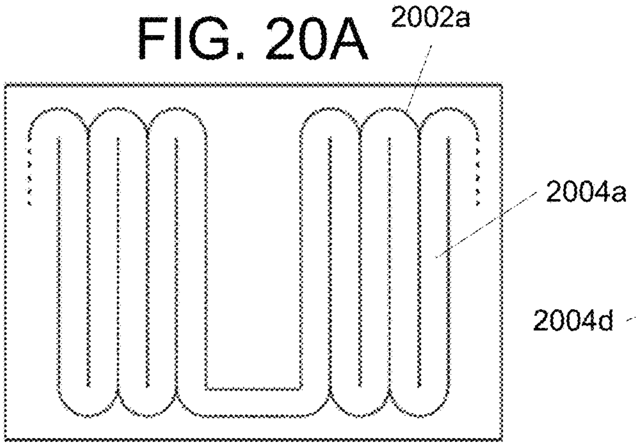
FIGS. 20A-20F illustrate, in simplified form, some alternative examples of the myriad of tortuous or serpentine strip configurations that can be created on labels constructed according to the teachings herein.
Figure 20D:
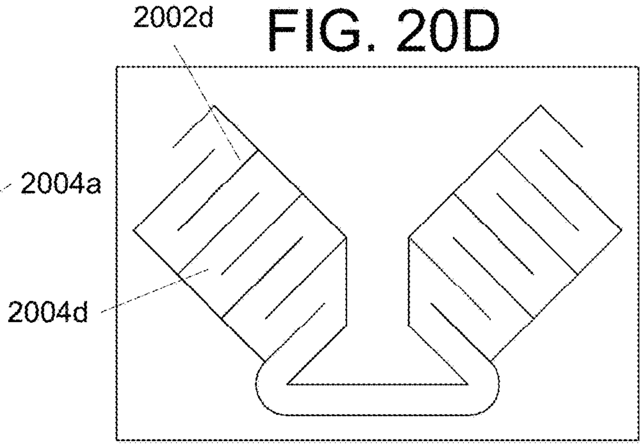
Figure 20B:
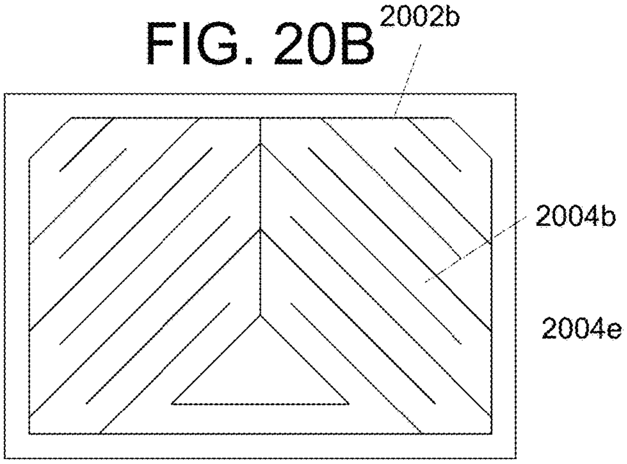
Figure 20E:
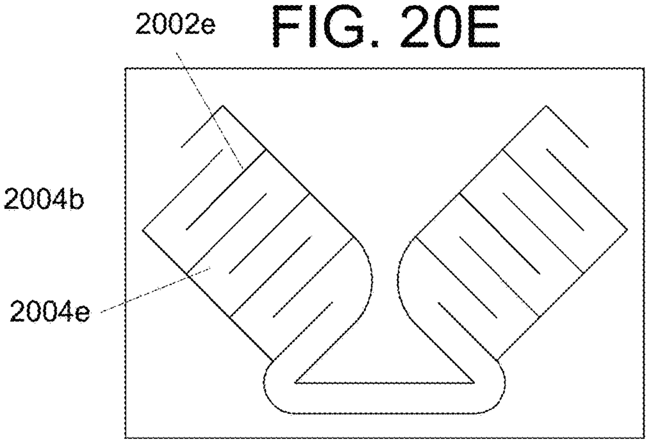
Figure 20C:
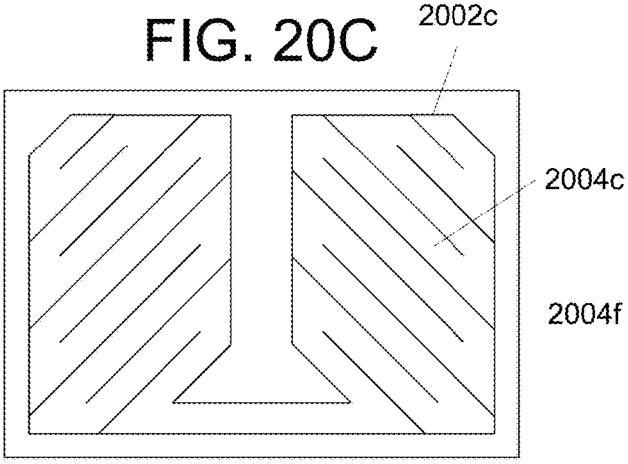
Figure 20F:
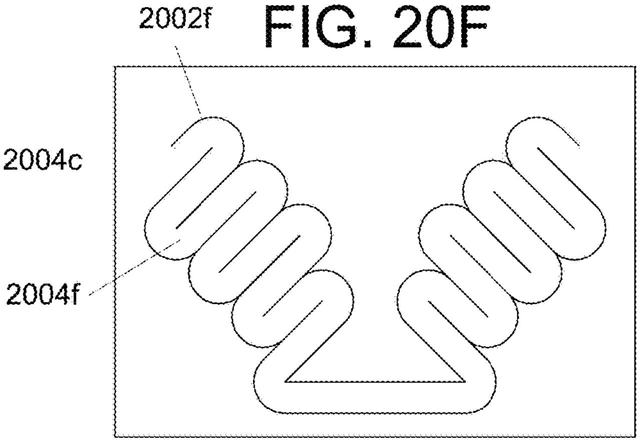

FIG. 19 illustrates, in simplified form, yet another application for a label constructed according to the teachings herein. As shown in FIG. 19, a large box 1900 includes at least a pair of labels 1902*a*, 1902*b* thereon containing common general signage, for example, as shown, "This Side Up" and "Fragile Do Not Drop" that can be affixed to a container and, when their tortuous or serpentine strips are deployed, can serve as handles.

Thus, the versatility and advantages provided by labels constructed according to the teachings herein should be apparent, among them being, for example, the ability to define tortuous or serpentine strips of varying peripheral shapes, lengths and/or widths such that, when they are deployed, they become short handles or long straps, facilitating, for example, easier carrying or hands free carrying of a container.

In this regard, FIGS. 20A-20F illustrate, in simplified form, some alternative examples of the myriad of tortuous or serpentine strip configurations that can be created on labels constructed according to the teachings herein As shown in each of FIGS. 20A-20F, different weakened areas 2002*a*-2002*f* are used to create different shaped tortuous or serpentine strips 2004*a*-2004*f*.

Still further, such labels can eliminate the need for molding or otherwise affixing of handles that project outward from their container and thereby require more material and take up more space.

As a general matter, for ease of understanding, the adhesives are shown in the above as covering the entirety of their respective areas. However, it is to be understood and appreciated that this is not a requirement and, depending upon the particular implementation, the adhesives can be placed on smaller areas provided, for example, coverage of the high tack adhesive, is sufficient to reliably adhere the label to its intended container and support more than the expected weight when the tortuous or serpentine strip is deployed as a handle.

The foregoing outlines, generally, the features and technical advantages of one or more implementations that can be constructed based upon the teachings in this disclosure in order that the following detailed description may be better understood. However, the advantages and features described herein are only a few of the many advantages and features available from representative examples of possible variant implementations and are presented only to assist in understanding. It should be understood that they are not to be considered limitations on the invention as defined by the appended claims, or limitations on equivalents to the claims. For instance, some of the advantages or aspects of different variants are mutually contradictory, in that they cannot be simultaneously present in a single embodiment. Similarly, some features or advantages may be applicable to one aspect and inapplicable to others. Thus, the foregoing features and advantages should not be considered dispositive in determining equivalence. Additional features and advantages, although not detailed herein, will be apparent from the teachings of the description, drawings, and claims.

What is claimed is:

1. A label for a container comprising:

a sheet material having a printable side and a reverse side opposite the printable side;

one or more weakened areas defining a tortuous or serpentine strip of the sheet material which, when deployed, forms an elongate strap sufficient to wrap about a portion of a person's torso;

a high tack adhesive on at least a portion of the reverse side; and wherein the one or more weakened areas defining the tortuous or serpentine strip are organized such that the tortuous or serpentine strip remains part of the label and a backing material is not needed to maintain the tortuous or serpentine strip in place between manufacture of the label and application of the label to the label's intended container.

2. The label of claim 1, wherein on the reverse side, the tortuous or serpentine strip is substantially free of the high tack adhesive.

3. The label of claim 2, wherein at least part of the tortuous or serpentine strip includes a low tack adhesive.

4. The label of claim 1, wherein the reverse side is also printable.

5. The label of claim 1, wherein the printable side is configured as a shipping label.

6. The label of claim 1, wherein the printable side includes product-related information.

7. The label of claim 1, wherein the printable side includes a sign.

8. The label of claim 1, further comprising a cutout in the label defining a tab.

9. The label of claim 8, wherein the tab is free of adhesive.

10. The label of claim 1, wherein the sheet material includes reinforcing fibers.

11. The label of claim 1, wherein the tortuous or serpentine strip of the sheet material, when deployed, forms a wide handle.

12. The label of claim 1, wherein the defined tortuous or serpentine strip of the sheet material is spiral in shape.

13. The label of claim 1, wherein the defined tortuous or serpentine strip of the sheet material comprises multiple S shapes.

14. The label of claim 13, further comprising a low tack adhesive is pattern printed on the reverse side.

15. The label of claim 1, wherein the high tack adhesive is pattern printed on the reverse side.

16. A label for a container comprising:

a sheet material having a printable side and a reverse side opposite the printable side;

one or more weakened areas defining a tortuous or serpentine strip of the sheet material which, when attached to the container and deployed, will form an elongate strap of a length sufficient to wrap about a portion of a person's torso and thereby allow the person to hands free carry the container to which the label will be attached;

a high tack adhesive on at least a portion of the reverse side outside the weakened areas defining the tortuous or serpentine strip; and a low tack adhesive on at least a portion of the reverse side within the weakened areas defining the tortuous or serpentine strip.

17. A method of making a label comprising:

forming one or more weakened areas, defining a tortuous or serpentine strip which, when deployed will form an elongate strap of a length sufficient to wrap about a portion of a person's torso and thereby allow for hands free carry by the person of an intended container to which the label will be applied, in a sheet material having a printable side and a reverse side opposite the printable side such that the tortuous or serpentine strip remains part of the label and a backing material is not needed to maintain the tortuous or serpentine strip in place between manufacture of the label and application of the label to the label's intended container; and applying a high tack adhesive to a reverse side of the sheet material in an area other than within the tortuous or serpentine strip defined by the one or more weakened areas.

18. The method of claim 17 further comprising:

applying a low tack adhesive to at least a portion of the reverse side within the weakened areas defining the tortuous or serpentine strip.

* * * * *